United States Patent
Morgenbrod

(10) Patent No.: US 10,295,131 B2
(45) Date of Patent: May 21, 2019

(54) SOLAR SIMULATOR AND METHOD FOR OPERATING A SOLAR SIMULATOR

(75) Inventor: Nico Morgenbrod, Berlin (DE)

(73) Assignee: OSRAM GMBH, Munich (DE)

( * ) Notice: Subject to any disclaimer, the term of this patent is extended or adjusted under 35 U.S.C. 154(b) by 394 days.

(21) Appl. No.: 13/980,326

(22) PCT Filed: Jan. 5, 2012

(86) PCT No.: PCT/EP2012/050128
§ 371 (c)(1),
(2), (4) Date: Jul. 18, 2013

(87) PCT Pub. No.: WO2012/098019
PCT Pub. Date: Jul. 26, 2012

(65) Prior Publication Data
US 2013/0294045 A1    Nov. 7, 2013

(30) Foreign Application Priority Data
Jan. 21, 2011 (DE) .......... 10 2011 002 960

(51) Int. Cl.
*F21V 7/00* (2006.01)
*F21S 8/00* (2006.01)
(Continued)

(52) U.S. Cl.
CPC .............. *F21S 8/006* (2013.01); *F21V 13/12* (2013.01); *H02S 50/10* (2014.12); *F21V 5/004* (2013.01);
(Continued)

(58) Field of Classification Search
CPC . F21V 13/02; F21V 13/14; F21V 5/02; F21V 5/04; F21V 9/00; F21V 9/02; F21Y 2113/00; F21S 8/006; G01J 1/08
(Continued)

(56) References Cited

U.S. PATENT DOCUMENTS 6,406,172 B1 *  6/2002  Harbers et al. ............... 362/544
6,950,454 B2 *  9/2005  Kruschwitz .......... H04N 9/3129
                                                 348/E9.026

(Continued)

FOREIGN PATENT DOCUMENTS

CN   101290340 A   10/2008
DE   10051357 A1   4/2002
(Continued)

OTHER PUBLICATIONS

Buttner et al. "Wave optical analisys of light-emitting diode beam shaping using microlens arrays", Oct. 2002, in Optical Engineering, vol. 41 No. 10, pp. 2393-2401.*

(Continued)

*Primary Examiner* — Diane I Lee
*Assistant Examiner* — Omar Rojas Cadima
(74) *Attorney, Agent, or Firm* — Viering Jentschura & Partner MBB

(57) ABSTRACT

A solar simulator with at least one lamp module, where the luminous module contains multiple light generating units is disclosed. Each of the light generating units contain at least one semiconductor light source, which generate light in a plurality of separately controllable wavelength ranges. Disposed downstream from the light generating units is a light-concentrating primary optical unit. A light-homogenizing secondary optical unit is likewise disposed downstream of the light generating units. And an imaging tertiary optical unit is disposed downstream of the secondary optical unit. A method for operating the solar simulator and the light generating units in such a way that the solar simulator generates light radiation that alters over time is also disclosed.

14 Claims, 4 Drawing Sheets

(51) Int. Cl.
  F21V 13/12 (2006.01)
  H02S 50/10 (2014.01)
  *F21V 5/00* (2018.01)
  *F21V 5/04* (2006.01)
  *F21Y 105/10* (2016.01)
  *F21Y 115/10* (2016.01)
  *F21Y 113/13* (2016.01)

(52) U.S. Cl.
  CPC ............ *F21V 5/045* (2013.01); *F21V 7/0091* (2013.01); *F21V 2200/00* (2015.01); *F21Y 2105/10* (2016.08); *F21Y 2113/13* (2016.08); *F21Y 2115/10* (2016.08)

(58) Field of Classification Search
  USPC ... 362/1, 4, 8, 209, 210, 211, 227, 228, 230, 362/231, 242, 311.01, 311.12; 313/110, 313/116, 272, 316
  See application file for complete search history.

(56) References Cited

U.S. PATENT DOCUMENTS

| | | | |
|---|---|---|---|
| 6,995,355 B2* | 2/2006 | Rains et al. | 250/228 |
| 7,733,111 B1 | 6/2010 | Zhao et al. | |
| 8,066,814 B2 | 11/2011 | Lew et al. | |
| 2002/0126479 A1* | 9/2002 | Zhai | G02B 5/32 362/244 |
| 2004/0020529 A1* | 2/2004 | Schutt et al. | 136/245 |
| 2007/0230179 A1* | 10/2007 | Ripoll et al. | 362/277 |
| 2008/0115830 A1 | 5/2008 | Shin et al. | |
| 2009/0026388 A1* | 1/2009 | Drozdowicz | G02B 27/0927 250/492.2 |
| 2009/0051914 A1* | 2/2009 | Trupke et al. | 356/302 |
| 2010/0259175 A1 | 10/2010 | Forster et al. | |
| 2010/0259198 A1 | 10/2010 | Morgenbrod | |

FOREIGN PATENT DOCUMENTS

| | | |
|---|---|---|
| DE | 102007059130 A1 | 6/2009 |
| DE | 102007059131 A1 | 6/2009 |
| TW | 200930851 A | 7/2009 |
| TW | 200930951 A | 7/2009 |

OTHER PUBLICATIONS

English abstract for DE 100 513 57 A1 dated Apr. 18, 2002.
English abstract for CN 101 290 340 A dated Oct. 22, 2008.
Office action dated Nov. 4, 2014 received for parallel Taiwanese application 201280006005.4 and English translation.
Wavelabs Solar Metrology Systems GmbH, "SINUS-220", 2015, 4 pages, www.wavelabs.de, Germany.
Chinese Office Action based on application No. 20128006005.4 (7 pages and 9 pages of English translation) dated Nov 4, 2014 (Reference Purpose Only)

* cited by examiner

SOLAR SIMULATOR AND METHOD FOR OPERATING A SOLAR SIMULATOR

RELATED APPLICATIONS

The present application is a national stage entry according to 35 U.S.C. § 371 of PCT application No.: PCT/EP2012/050128 filed on Jan. 5, 2012, which claims priority from German application No.: 10 2011 002 960.5 filed on Jan. 21, 2011.

The disclosure relates to a solar simulator including a plurality of semiconductor light sources and at least one optical unit disposed downstream. The disclosure furthermore relates to a method for operating a solar simulator.

BACKGROUND

Xenon flash lamps for testing solar cells are known. The use of xenon flash lamps has the disadvantage that a poor reproducibility of rapidly cyclic measurements arises since a capacitor charge influences a flash power. Moreover, the xenon flash lamps have only a short lamp lifetime in conjunction with high process costs and a high use of energy. Furthermore, the emitted spectrum is fixedly predetermined and cannot be tracked. Moreover, a high power is consumed in wavelength ranges in which solar cells are not active.

SUMMARY

DE 10051357 A1 describes a device for irradiating solar cells which contains at least 400 solid-state radiation sources, to be precise in a matrix-type planar arrangement for emitting monochromatic light (matrix light source) in a spectrum of 880 nm preferably for silicon cells. The matrix light source is embodied as an XY matrix, wherein the currents of the solid-state light sources can be controlled individually. The matrix light source can have groups of solid-state light sources having different spectral light emission, wherein a desired mixed spectrum can be generated by suitable control of the groups.

US 2008/0115830 A1 discloses sets of solar cells and lenses which are situated on a surface of a solar concentrator module. The solar cell is situated at a focal point of the lens. The other sets whose solar cells are replaced by lighting devices are situated on the opposite surface of the solar concentrator module. Each further set is reversely placed on a previous set. Therefore, the light shining through the latter set and the previous set from the lighting device is focused onto the solar cell.

DE 10 2007 059 130 A1 and DE 10 2007 059 131 A1 specify methods and arrangements for setting a color locus and a luminous system. DE 10 2007 059 130 A1 describes a method for setting a color locus of at least one luminous source, wherein a temperature is determined and wherein the color locus of the at least one luminous source is set depending on the temperature determined. Moreover, an arrangement for carrying out the method is described. DE 10 2007 059 131 A1 describes a method for setting a color locus, wherein n luminous sources are provided, of which n−3 luminous sources are preset or have been preset, wherein a difference between the color locus of the n−luminous sources and a desired color locus is determined, and wherein the 3 luminous sources not preset are set in such a way that the desired color locus is achieved. Furthermore, an arrangement for carrying out the method is described.

Preferred embodiments can be gathered in particular from the dependent claims.

Various embodiments provide a solar simulator comprising at least one luminous module, wherein the at least one luminous module has: a plurality of light generating units, wherein each of the light generating units has at least one semiconductor light source with a light-concentrating primary optical unit disposed downstream; a light-homogenizing secondary optical unit disposed downstream of the light generating units; and an imaging tertiary optical unit disposed downstream of the secondary optical unit; wherein the semiconductor light sources generate light in a plurality of separately controllable wavelength ranges.

This solar simulator enables energy fed in to be effectively converted into light. The light ("mixed light") composed of the plurality of wavelength ranges can be made available reproducibly by the solar simulator with a very homogeneous power or intensity and a very homogeneous spectral distribution over a large area and with high accuracy (e.g. for measurement purposes. In other words, the same spectrum and the same power can be made available at every location of the irradiated area. The homogeneous distribution can already be provided directly behind the solar simulator, in particular even at a short-focal-length operating distance, for example of approximately 400 nm, which allows compact arrangements.

Preferably, the at least one semiconductor light source comprises at least one light emitting diode. If a plurality of light emitting diodes are present, they can emit light in the same color or in different colors. A color can be monochromatic (e.g. red, green blue, etc.) or multichromatic (e.g. white). The light emitted by the at least one light emitting diode can also be an infrared light (IR LED) or an ultraviolet light (UV LED). A plurality of light emitting diodes can generate a mixed light; e.g. a white mixed light. The at least one light emitting diode can contain at least one wavelength-converting phosphor (conversion LED). The phosphor can alternatively or additionally be arranged remote from the light emitting diode ("remote phosphor"). The at least one light emitting diode can be present in the form of at least one individually housed light emitting diode or in the form of at least one LED chip. A plurality of LED chips can be mounted on a common substrate ("submount"). The at least one light emitting diode can be equipped with at least one dedicated and/or common optical unit for beam guiding. Instead of or in addition to inorganic light emitting diodes, e.g. based on InGaN or AlInGaP, organic LEDs (OLEDs, e.g. polymer OLEDs) can generally be used as well. Alternatively, the at least one semiconductor light source can have e.g. at least one diode laser.

The light-concentrating primary optical unit serves to reduce or narrow an aperture angle of a light beam generated by the at least one semiconductor light source and incident in the primary optical unit. The light-concentrating primary optical unit can also be designated as a collimation optical unit or correspond thereto.

In one development, the semiconductor light source(s) associated with one of the separately controllable wavelength ranges can be controlled in a fixedly predefined manner, e.g. with a fixedly predefined current or current ratio. Alternatively, the semiconductor light source(s) can be controlled in a variable manner, e.g. in order to track a light intensity or light color or to adjust it to a new value.

In one configuration, the primary optical unit is designed and arranged for generating a concentrated light beam having an aperture angle of not more than 15°, in particular of not more than 10°. This collimation function enables a particularly homogeneous light distribution in the light-homogenizing secondary optical unit disposed downstream.

The primary optical unit may include an optical waveguide, for example. The light entering into the collimating optical waveguide can be reflected by total reflection in particular at the free lateral surfaces ("TIR ('Total Inner Reflection') Rod"). Alternatively, the sides of the optical waveguide can be reflectively treated.

The optical waveguide can be a concentrator, in particular. The concentrator can be for example a compound concentrator, such as a CPC concentrator (CPC; "Compound Parabolic Concentrator"), a CHC ("Compound Hyperbolic Concentrator") concentrator, a CEC ("Compound Elliptic Concentrator") concentrator etc. However, other collimation optical units can also be used.

The optical waveguide can consist of glass or plastic, for example. Alternatively or additionally, the primary optical unit can be configured as a reflector, in particular a shell-type reflector.

In one development, moreover, different primary optical units, e.g. an optical waveguide and a reflector, two structurally different optical waveguides or two structurally different reflectors, are disposed downstream of at least two (structurally), different light generating units.

In yet another, in particular function-imparting, configuration, the secondary optical unit comprises a fly's eye condenser. The fly's eye condenser can have, for example, two microlens arrays applied on both sides on a common substrate. Alternatively, the fly's eye condenser can have two microlens arrays applied respectively on one side on substrates arranged spaced apart.

In one configuration, furthermore, the tertiary optical unit comprises a Fourier optical unit, in particular Fourier lens (e.g. a converging lens used as a Fourier optical unit), in particular Fresnel lens.

A tertiary optical unit may be disposed downstream of one or a plurality of secondary optical units.

In one configuration, furthermore, the tertiary optical unit produces a defined pincushion distortion ("Seidel aberration"). Thus, in the case of an array-like planar arrangement of a plurality of luminous modules in which the images or image regions of the luminous modules are projected adjacent to one another, a particularly homogeneous light distribution over a plurality of image regions can be made possible because the pincushion distortions, upon their superimposition, can at least partly compensate for a decrease in brightness at the edge of the individual image regions.

In one configuration, moreover, the tertiary optical unit generates at least one image or an image region of a beam bundle emitted by a secondary optical unit with a close-packable basic shape. As a result, a plurality of image regions can be arranged in a manner directly adjoining one another or without gaps and therefore completely cover an image area, without their needing to overlap. However, the image regions can overlap in regions of (slight) deviations from the basic shape, e.g. in distorted regions, and/or in outer edge regions. A close-packable basic shape can comprise, for example, a rectangular basic shape or a hexagonal basic shape.

In another configuration, the semiconductor light sources generate light in at least four, in particular at least five, separately controllable wavelength ranges. This number of wavelength ranges already enables a practically expedient approximation to the solar spectrum with at the same time low control outlay. Thus, the methods and arrangements described in DE 10 2007 059 130 A1 and DE 10 2007 059 131 A1 can also advantageously be used for the present solar simulator.

Thus, it may be the case in one development, in particular, that for setting a color locus of at least one luminous module, at least one light generating unit, at least one semiconductor light source and/or at least one wavelength range (color channel), n wavelength ranges are provided, of which n−3 wavelength ranges or the semiconductor light sources thereof are preset or have been preset, wherein a difference between the color locus of the n wavelength ranges or the semiconductor light source(s) thereof and a desired color locus is determined and wherein the three wavelength ranges, or the semiconductor light source(s) thereof, not preset are set such that the desired color locus is achieved. In particular, the difference in color locus can be determined with the aid of at least one measuring device, wherein the at least one measuring device comprises, in particular, one of the following sensors: a brightness sensor, in particular a $v_\lambda$-weighted brightness sensor, a temperature sensor and/or a color sensor. In particular, at least one sensor in each case is provided for each wavelength range or the semiconductor light source(s) thereof. The color locus can be set in such a way that at least one of the target variables: color rendering index, color quality scale or an application-dependent spectral distribution attains a predefined value as well as possible. In particular, an optimization with regard to the at least one target variable can be carried out beforehand and provided in particular as control information for the n−3 wavelength ranges or the semiconductor light source(s) thereof. Furthermore, the at least one target variable can be set on the basis of the n wavelength ranges or the semiconductor light source(s) thereof by means of at least one of the following parameters: luminous flux, irradiance, light intensity or luminance. Moreover, the three wavelength ranges, or the semiconductor light source(s) thereof, not preset can span a triangle in a CIE x-y diagram, the triangle having, in particular, an area as large as possible. Moreover, the three wavelength ranges, or the semiconductor light source(s) thereof, not preset can be set iteratively such that the desired color locus is achieved. Moreover, for setting the desired color locus, in addition a relative or absolute desired color locus and/or brightness information can be predefined in a settable manner.

In one configuration, moreover, at least one wavelength range includes infrared radiation.

In yet another configuration, at least one wavelength range includes ultraviolet radiation ("UV wavelength range"). Thus, in particular radiation-induced ageing effects (weathering) can be realistically simulated. In particular, this UV wavelength range may be in the near ultraviolet, in particular in a wavelength range of approximately (370+/−50) nm.

In one configuration, moreover, at least one light generating unit has a plurality of semiconductor light sources, wherein the semiconductor light sources generate light in at least two separately controllable wavelength ranges. Thus, the associated primary optical unit can be used for a plurality of wavelength ranges, which saves costs and enables a compact design.

In one configuration, furthermore, the solar simulator comprises a plurality of luminous modules, wherein the luminous modules generate images or image regions substantially adjoining one another (array-like planar arrangement). The light distribution is preferably substantially homogeneous over image regions adjoining one another. Thus, areas of practically any desired size can be irradiated with sun-like light with high power density.

In one specific configuration, adjacent luminous modules generate image regions which overlap at their distorted edge projections, in particular corners. This supports, in particular together with a defined pincushion distortion of the individual image regions, the homogeneous light distribution (intensity and/or spectral distribution) over different image regions.

In another development, the solar simulator has at least one control device for controlling the light generating units or the semiconductor light source(s) thereof.

The control device can be designed, in particular, for controlling the light generating units, in particular semiconductor light sources of identical type, in a variable manner, in particular in order to set or adjust in a variable manner a power density and/or a (mixed) color locus of the mixed light generated by the luminous module and/or the solar simulator.

In particular, the control device can be designed for modeling the mixed light of a sunlight property over the course of a day in order to realize realistic daylight curves. Thus, the daylight in the morning and evening may have a lower intensity and a higher red proportion than at midday. Alternatively, individual spectral distributions may be realized.

In one general development, the luminous module and/or the solar simulator have/has at least one measuring device. The at least one measuring device may be designed, in particular, for sensing at least one property of the light generated, for example comprise at least one color sensor and/or at least one brightness sensor, for example individually for one or a plurality of the color channels, in particular each of the color channels. Additionally or alternatively, the at least one measuring device may comprise at least one temperature sensor. The sensors can be used, in particular, in an analogous manner to that described in DE 10 2007 059 130 A1 and DE 10 2007 059 131 A1.

Thus, for setting a color locus of at least one luminous module, at least one light generating unit, at least one semiconductor light source and/or at least one wavelength range (color channel), a temperature can be determined and the color locus can be set depending on the temperature determined. The color locus can comprise a brightness and/or a color saturation. The color locus can correspond to a desired color locus, which is predefined there, in particular. The temperature can be, in particular, a temperature of a light generating unit or of a semiconductor light source (e.g. measured directly at the semiconductor light source or at an associated substrate, etc.). The temperature can be determined in particular with the aid of the at least one temperature sensor, in particular with the aid of an NTC thermistor and/or a PTC thermistor. Alternatively or additionally, the temperature can be determined on the basis of an emitted power and/or on the basis of a thermal resistance. On the basis of the temperature of the at least one luminous module, light generating unit and/or semiconductor light source, it is possible to determine an associated brightness and wavelength, in particular peak wavelength of the wavelength range, of the at least one luminous source. The brightness and the wavelength can be determined depending on predefined calibration data. The brightness and the wavelength can also be determined depending on ageing information concerning the at least one luminous module, light generating unit and/or semiconductor light source, particularly if the ageing information is an ageing characteristic curve of the luminous source. The brightness and the wavelength can be converted into an actual color locus. In particular, the actual color locus can be compared with the (desired) color locus and the at least one luminous module, light generating unit and/or semiconductor light source can be set such that the color locus is achieved. In particular, the at least one luminous module, light generating unit and/or semiconductor light source can be set iteratively such that the color locus is achieved. However, for such a setting of the color locus alternatively or additionally other sensors, color sensors and/or brightness sensors, can also be used.

It is particularly advantageous if, for each luminous module, provision is made of corresponding sensors (in particular color, brightness and/or temperature sensors) for the purpose of setting the color locus (in particular for the calibration thereof), for each separately controllable wavelength range of the luminous module, in particular at least one sensor for each separately controllable wavelength range.

Generally, each luminous module can be designed for automatically setting or regulating the color loci of the plurality of separately controllable wavelength ranges. For this purpose, each luminous module can have at least one control device.

In one development, moreover, the at least one measuring device is coupled to the control device, in particular in order to enable an adaptation or regulation of the light generating units or semiconductor light sources. As a result, a very precise reproducibility of the mixed light and/or of the individual light components or color channels can be achieved. In particular, a calibration and/or self-calibration is also made possible.

In another development, the control device includes a central control unit and/or a control unit for each luminous module, in particular for communication between a plurality of luminous modules ("module-module communication").

In particular for tuning a light emission of a plurality of luminous modules of the solar simulator, in particular for tuning the color locus thereof, the luminous modules, in particular the control units thereof, can be designed for module-module communication.

In another development, each luminous module is able to control and/or adjust a desired brightness value precisely to at least 2%. In another development, the luminous modules (if a plurality of luminous modules are present) are able to control and/or adjust their brightness values to an (overall) desired brightness value for all the luminous modules precisely to at least 2%. The capability for module-module, communication, in particular, can be used for this purpose.

In another development, the solar simulator has an interface for outputting spectral properties and/or information about a brightness distribution of the light emitted by said solar simulator. The interface may, for example, be able to be coupled to a measuring apparatus of the solar cell(s) to be irradiated. This enables a correlation and fine correction of the measurement value of the solar cell for each measurement.

In one development, furthermore, the luminous module and/or the solar simulator are/is equipped with a liquid cooling system, in particular water cooling system, in order to effectively dissipate waste heat generated during the generation of light or radiation. The use of a water cooling system has the advantage that very effective heat dissipation can be achieved, as a result of which a low junction temperature can be complied with even at high operating currents. A service life is thus lengthened as well. Moreover, effective LED operation with low temperature losses is made possible. The water cooling system furthermore supports the stability of the generation of light and outputting of light. Furthermore, the water cooling system simplifies joint use of a high number of luminous modules.

In another development, the water cooling system of the solar simulator is connected to a heat-recovering cooling water circuit, e.g. of a factory. Particularly energy-saving operation of the solar simulator is made possible as a result.

The disclosure provides a method for operating a solar simulator, in particular as described above, wherein the light generating units or semiconductor light sources are controlled in such a way that the solar simulator generates a (predetermined) light emission that changes over time. The light emission that changes over time can be modeled in particular on sunlight over the course of a day.

The solar simulator may be operated in a continuous mode or in a flash mode.

In the following figures, the disclosure is described schematically in greater detail on the basis of exemplary embodiments. In this case, identical or identically acting elements may be provided with identical reference signs for the sake of clarity.

Figure 1:
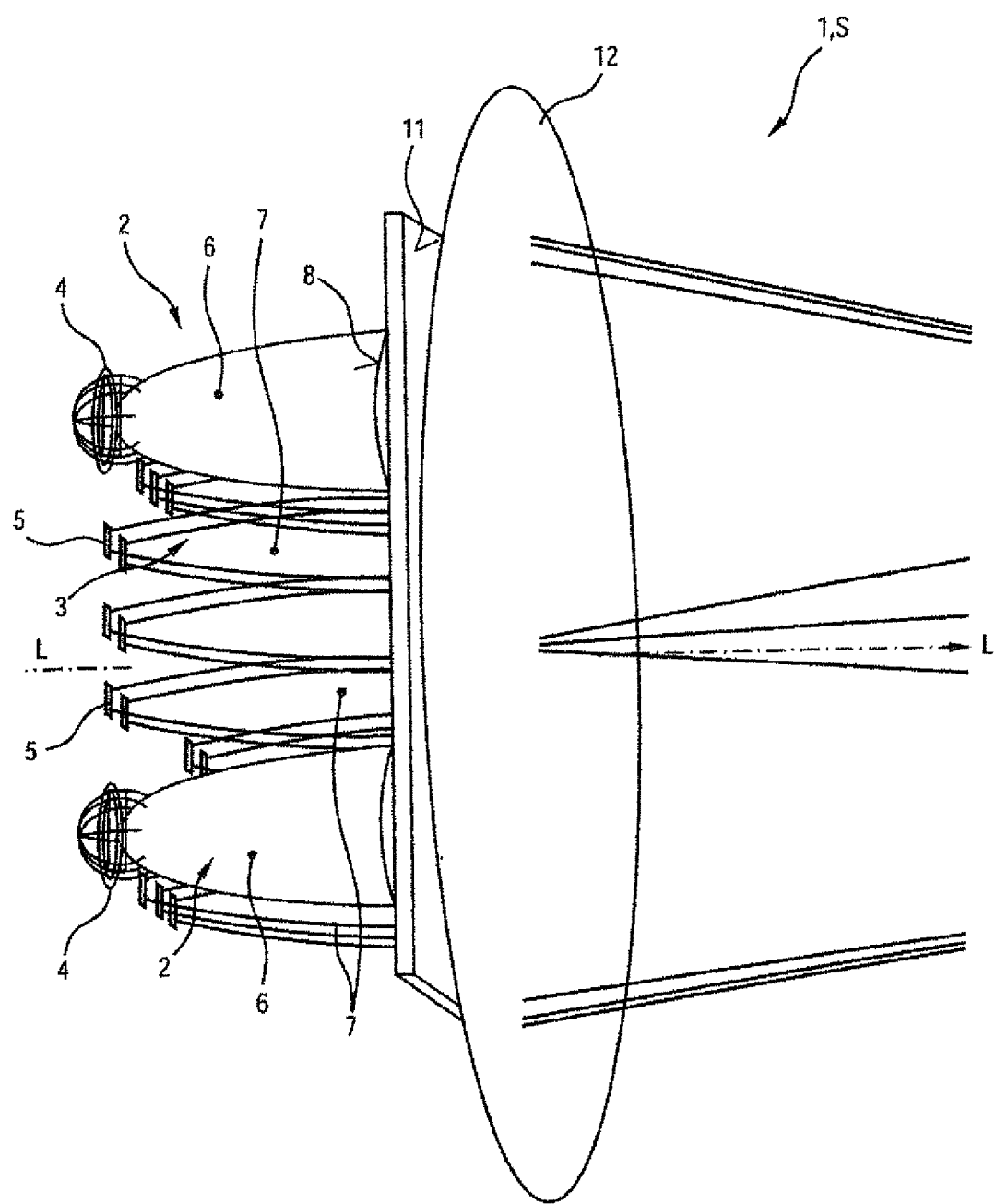
FIG. 1 shows in a view obliquely from the side a luminous module in accordance with a first embodiment for a solar simulator.
Figure 2:
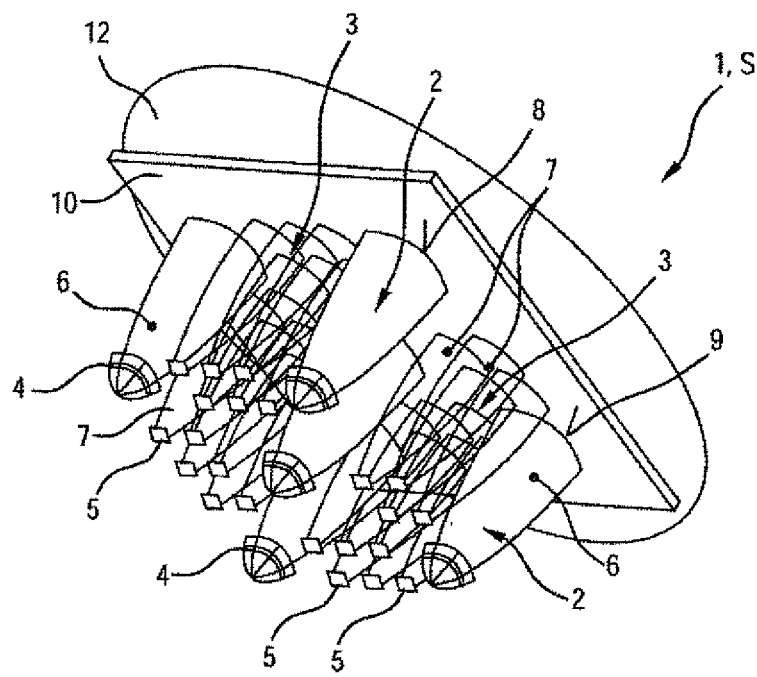
FIG. 2 shows the luminous module in accordance with the first embodiment in a view obliquely from the rear.

FIG. 1 shows in a view obliquely from the side a luminous module 1 for a solar simulator S. FIG. 2 shows the luminous module 1 in a view obliquely from the rear. The solar simulator S has at least one luminous module 1.

The luminous module has a plurality of light generating units 2,3, namely five first light generating units 2 and twenty-four second light generating units 3. The first light generating units 2 and the second light generating units 3 are arranged rotationally symmetrically by 90° relative to a longitudinal axis L of the luminous module. To put it more precisely, the five first light generating units 2 are arranged in a matrix arrangement with one central light generating unit 2 (through which the longitudinal axis L runs) and four outer light generating units 2, while twenty-four second light generating units 3 are arranged in groups each of six light generating units 3 between adjacent light generating units 2.

Each of the light generating units 2, 3 has a plurality of semiconductor light sources in the form of light emitting diodes (LEDs). The first light generating unit 2 here has by way of example a set 4 with a plurality of infrared light emitting LEDs (IR LEDs), wherein these IR LEDs can have different wavelengths or wavelengths bands. The second light generating unit 3 has a set 5 with a plurality of LEDs, wherein these LEDs, too, can have different wavelengths or wavelength bands, e.g. can emit visible light and/or IR light. For this purpose, e.g. LEDs of different colors (i.e. LEDs which emit light of different wavelengths), can be used, wherein IR LEDs can additionally be present as well.

The sets 4 and/or 5 can be present as LED modules, wherein each LED module has a plurality of LEDs on a common substrate. The LEDs can be present as LED chips, in particular, which are applied e.g. on a common ceramic substrate. The LEDs can be present as individually housed high-power LEDs.

Each of the sets 4,5 is connected to a liquid cooling system in the form of a water cooling system (not illustrated) used here by way of example, in order to dissipate the waste heat generated by the LEDs.

A light-concentrating primary optical unit 6 and 7 is respectively disposed downstream of each of the sets 4, 5 in order to reduce an emission angle of the respectively emitted light beam, in particular with respect to the longitudinal axis L ("collimation unit"). The emission characteristic—typical of LEDs—of a Lambertian emitter having an emission angle of 180° or an aperture angle of θ=90° with respect to the principal emission axis, optical axis or longitudinal axis is thus reduced, preferably to θ≤approximately 15°, even more preferably to θ≤approximately 10°.

The primary optical unit 6 disposed downstream of the respective set 4 is present in the form of a reflector shell, e.g. having a parabolic cross-sectional profile. The IR LEDs of the respective set 4 therefore introduce beams of radiation into the primary optical unit 6 which are output through a front light exit plane 8 partly in the manner reflected at the IR-reflectively configured inner walls of the primary optical unit 6 and partly in an unreflected manner.

The primary optical unit 7 disposed downstream of the respective set 5 is present in the form of an optical waveguide. The LEDs of the respective set 5 therefore introduce beams of radiation into the primary optical unit 7 that are output through a front light output surface 9 partly in a manner totally reflected at the outer sides of the primary optical unit 7 and partly in an unreflected manner. The primary optical unit 7 can consist for example of glass, in particular quartz glass, or of plastic, in particular cycloolefin polymers (COP) such as are obtainable for example under the name Zeonex or Zeonor from Zeon Europe GmbH, Germany, or cycloolefin copolymers (COC) such as are available for example under the name TOPAS from TOPAS Advanced Polymers GmbH, Germany. The light output surface 9 and the light exit plane 8 lie substantially in a common plane and have the same principal emission direction.

A light-homogenizing secondary optical unit 10 having a rectangular basic shape in plan view along the longitudinal axis L is disposed downstream of the light generating units 2, 3 and the primary optical units 6 and 7. The secondary optical unit 10 serves, inter alia, for homogenizing or matching the light incident from the light generating units 2, 3 over a light emission surface 11 of the secondary optical unit 10 with regard to an intensity or light intensity and also a color or wavelength(s). To an observer, the light emission surface 11 ideally appears as a rectangular, homogeneously radiative surface.

In the present embodiment, the secondary optical unit 10 is configured as a fly's eye condenser. The fly's eye condenser can have, in particular, two arrays comprising fly's eye matrix arrangements of microlenses, said arrays being optically connected in series and arranged in an offset manner, wherein the subapertures of the microlenses of the first array are (can be) imaged onto the target plane in particular congruently by the tertiary optical unit 12 (see below). Particularly in combination with the primary optical units 6 and 7, concentrating light to an aperture angle of preferably θ≤approximately 15°, even more preferably θ≤approximately 10°, a high degree of homogenization can be achieved by means of the secondary optical unit 10.

Figure 4:
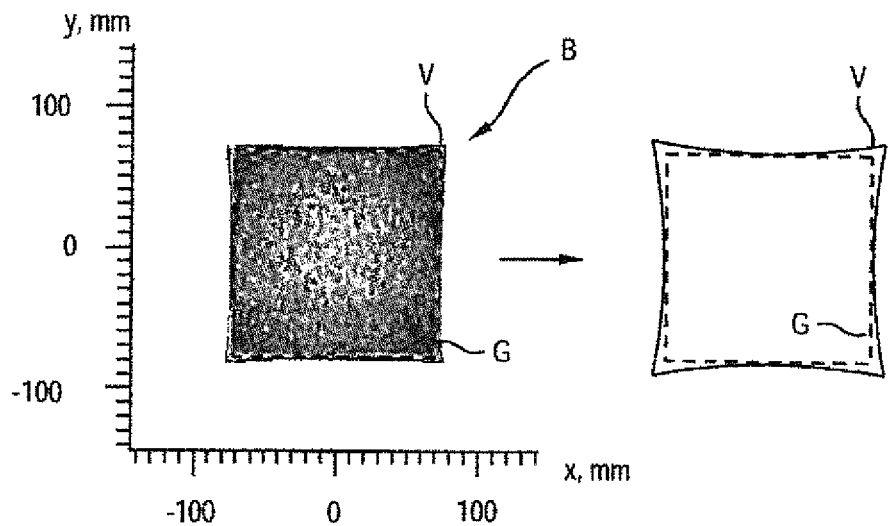
FIG. 4 shows a brightness distribution of an image generated by means of one of the luminous modules.

Optionally, an imaging tertiary optical unit 12 in the form here of a Fourier optical unit, in particular Fourier lens, in particular a space-saving Fresnel lens is disposed downstream of the secondary optical unit 10 in order to image the light from the secondary optical unit 10 onto a desired image region B, which is situated in or at a focal point of the tertiary optical unit 12, as shown e.g. in FIG. 4, e.g. a solar cell or a surface to be weathered.

The tertiary optical unit 12 may be disposed downstream of one or a plurality of secondary optical units 10. By virtue of the rectangular basic shape of the plurality of secondary optical units 10, the latter can be arranged substantially without any gaps and substantially without an overlap ("close-packed basic shape"), with respect to one another. The tertiary optical unit 12 may also have a differently shaped outer contour, e.g. a conformal outer contour with respect to the secondary optical unit or units 10, e.g. a quadrilateral, in particular square, outer contour.

The light generating units 2, 3 can generally be controlled in such a way that LEDs of identical type, also of different light generating units 2, 3, can be controlled jointly and, if appropriate, also independently of other LEDs e.g. with regard to their operating current. In other words, in particular, separate color channels of the luminous module 1 and/or of the solar simulator S can be controlled individually. By way of example, all LEDs of an identical color can be controlled jointly. As a result, by means of the secondary optical unit 10, it is possible in particular also to generate a mixed light with an adjustable color locus from a plurality of groups of LEDs of identical type within a color space that can be realized by the luminous module ("Gamut"). For the control of the light generating units 2, 3, the LEDs can be connected to a suitable control device or driver or be controlled or supplied thereby.

The control device may be able, in particular, to control the light generating units 2, 3 in a variable manner, in particular to variably set or adjust a power density and/or a (mixed) color locus of the mixed light generated by the luminous module 1 and/or the solar similar S. In particular, the mixed light can thus be modeled on a sunlight property over the course of a day in order to realize real daylight curves. Thus, the daylight in the morning and evening may have a lower intensity and a higher red proportion than at midday. Alternatively, individual spectral distributions may be simulated.

Furthermore, the luminous model 1 and/or the solar simulator S may have at least one measuring device for sensing at least one property of the light generated. The at least one measuring device may comprise, for example, at least one color sensor, at least one brightness sensor and/or at least one temperature sensor, for example individually for one or a plurality of the color channels, in particular each of the color channels.

In particular, the at least one color sensor and/or the at least one brightness sensor can be sensitive to backscattered and/or reflected-back light, in particular calibrated thereto.

The at least one measuring device is coupled to the control device in order to enable the control device to adapt or regulate the light generating units 2, 3. Consequently, very precise reproducibility of the mixed light and/or of the individual light components or color channels can be achieved by means of a tracking of the light source by the control device. In particular, a calibration and/or self-calibration of the luminous module 1 and/or of the solar simulator S is also made possible.

The control unit may include a central control unit and/or a communication between a plurality of luminous modules 1.

Figure 3:
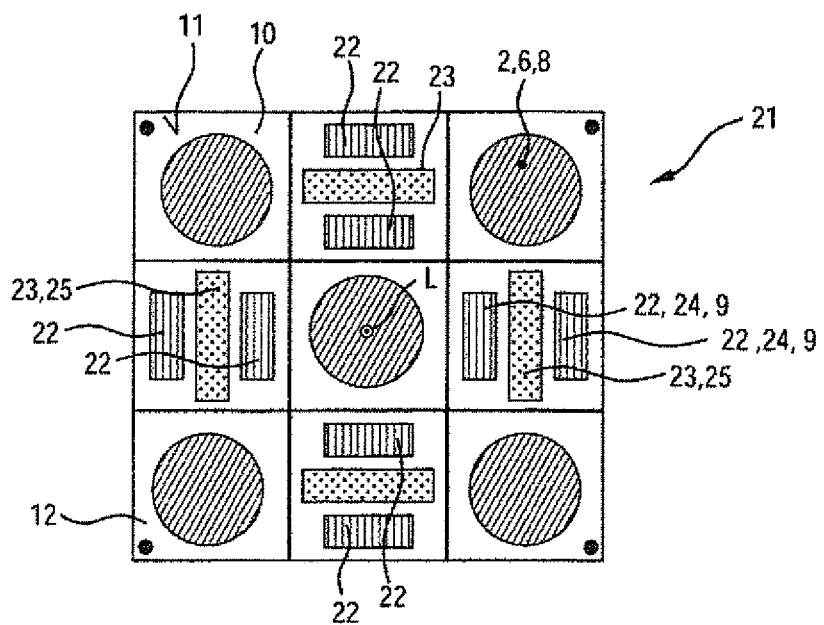
FIG. 3 shows a luminous module in accordance with a second embodiment in a view from the front.

FIG. 3 shows a luminous module 21 in accordance with a second embodiment in a view from the front. In contrast to the luminous module 1, the luminous module 21 has eight second light generating units 22 and four third light generating units 23. The second light generating units 22 differ from the second light generating units 3 of the first embodiment in that their primary optical units 24 have an elongate shape counter to the longitudinal axis L in plan view. In each case two second light generating units 22 are arranged between two outer first light generating units 2, and in each case one third light generating unit 23 is arranged between two adjacent second light generating units 22. The primary optical units 25 of the third light generating units 23 are wider than the primary optical units 24 of the second light generating units 22, but oriented parallel thereto in plan view. The second light generating units 22 and the third light generating units 23 can have identical or different sets 4 of LEDs.

The secondary optical unit 10 designed as a fly's eye condenser makes it possible, in particular in combination with the tertiary optical unit 12, that its light emission surface 11 emits light substantially homogeneously, to be precise even when only some of the light generating units 2, 22 and/or 23 are switched on, e.g. only the light generating units 22 and/or 23.

However, on account of edge effects in practice a decrease in intensity would often occur at the edge of the secondary optical unit 10 and primarily also at the edge of the image surface in the Fourier plane of the tertiary optical unit 12. FIG. 4 shows a brightness distribution of a sharply delimited image or image region B generated by means of the luminous module 1 or 21 in the Fourier plane of the tertiary optical unit 12. The distance between the image region B and the luminous module 1 is approximately 450 mm. The decrease in intensity usually results in a rounded intensity distribution, to be precise also in the case of a rectangular functional surface, in particular microstructure arrangement, of the secondary optical unit 10. In order to compensate for this rounded intensity distribution with simple means, the luminous module 1 or 21 produces a defined pincushion distortion V ("Seidel Aberration") of the rectangular basic shape G. This can mean, in particular, that the corners of the image region B protrude outward from the rectangular basic shape G. The outer contours of the basic shape G and of the distortion V are illustrated again schematically on the side to the right of the image region B.

Figure 5:
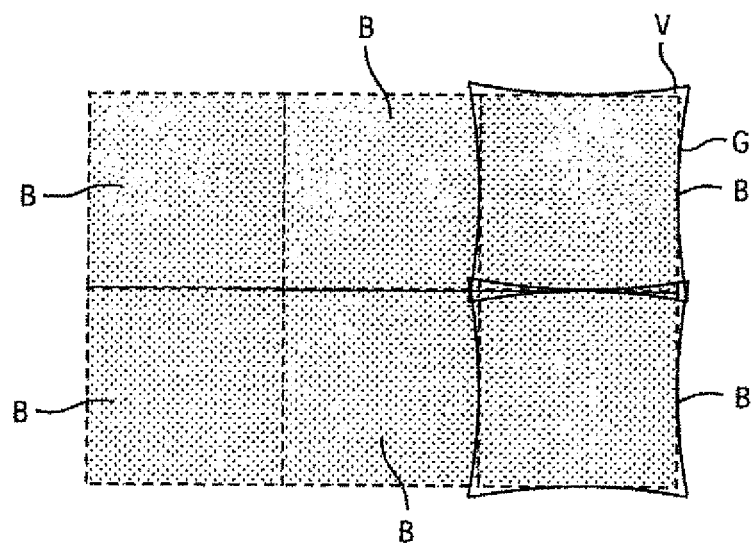
FIG. 5 shows in plan view an arrangement of images of a plurality of luminous modules of a solar simulator.

FIG. 5 shows in plan view an arrangement of image regions B of a plurality of luminous modules 1 arranged directly adjacent in a solar simulator S ("array-light planar arrangement"). The basic shapes G of the image regions B form at least one common, substantially rectangular area of 156 $mm^2$, which corresponds to an area of a typical solar cell, or a multiple thereof. The pincushion distortions V at least partly compensate for the decrease in intensity at the edge of the respective secondary optical unit 10 or basic shapes G of the image regions B by virtue of their overlapping one another, and if appropriate also the outermost edge regions of the sides of the basic shapes G.

Therefore, instead of wanting to compensate for the decrease in intensity at the edge and the pincushion distortion V separately as undesirable effects with high complexity, the pincushion distortion V is therefore maintained here with a comparatively low complexity for increasing the intensity at the edge of the associated image region B. Overall, a light distribution that is extremely homogeneous chromatically and also by terms of its power density distribution arises over the image regions B. The simple array-like planar configurability therefore enables an on the whole low-distortion optical system including a plurality of luminous modules 1 arranged adjacent.

Figure 6:
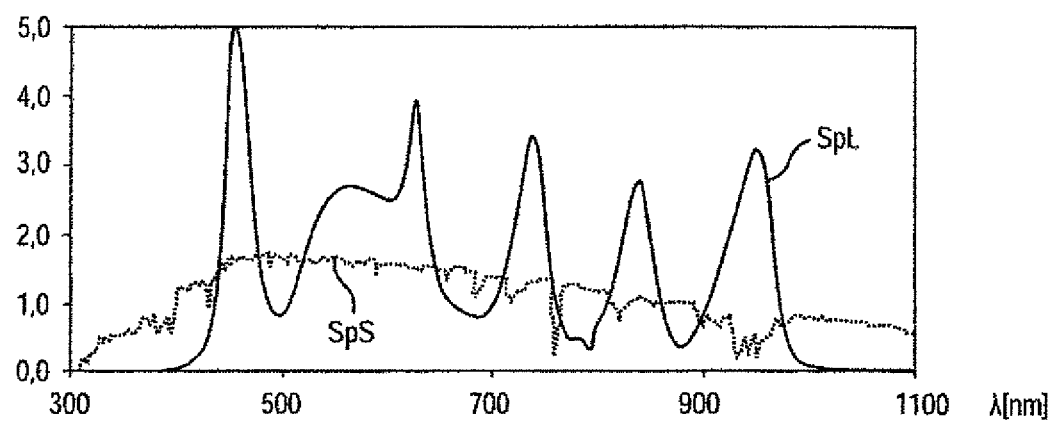
FIG. 6 shows a spectral distribution of the image generated by the luminous module.

FIG. 6 shows a spectral distribution of the image regions B generated by the luminous module 1 as a plot of a spectral power in arbitrary units against a wavelength λ in nm. The solar spectrum SpS is depicted in a dotted fashion, while the LED spectrum SpL is depicted in a solid fashion. The LED spectrum SpL is composed here of five different color channels generated by means of five groups of LEDs. However, here it is also possible to use fewer, in particular four, and also more color channels. The use of a plurality of color channels enables the solar spectrum SpS to be approximated more precisely.

Here the LED spectrum SpL is composed of the individual channels or wavelength ranges λ=(950 peak wavelength+/−50) nm, (850+/−50) nm, (740+/−50) nm, (630+/−50) nm and (450+/−50) nm.

Overall, the luminous module 1 can generally generate a radiance of more than 1000 W/m$^2$, which is higher than the radiance of the sun on the earth at medium latitudes such as e.g. in Central Europe, such that in particular solar governed ageing effects can be examined in a shortened time.

The luminous module or luminous modules 1 therefore afford(s) the advantage that a power and a spectral distribution of the mixed light can be reproducibility made available (a) very homogeneously, (b) over a large area and (c) with high accuracy (e.g. for measurement purposes).

Furthermore, the optical system ensures that the same spectrum is available with the same radiation power at every location of the irradiated area.

The luminous module 1 and/or the solar simulator S can be equipped with a water cooling system, in particular, in order to effectively dissipate waste heat generated during the generation of light or radiation. For this purpose, in particular, the substrates of the LEDs can be thermally connected to a water cooling device. The use of a water cooling system has the advantage that very effective heat dissipation can be achieved, as a result of which a low junction temperature can be complied with even at high operating currents. Moreover, a service life is thus lengthened. Effective LED operation with low temperature losses is additionally made possible. The water cooling system furthermore supports the stability of the generation of light and outputting of light to be precise with regard both to an intensity and a spectral constancy (avoidance of a thermally governed spectral shift). Furthermore, the water cooling system simplifies joint use of a high number of luminous modules 1, in particular in an array-like planar arrangement.

The possibility of recovering the waste heat in a factory cooling water circuit is particularly advantageous when using the water cooling system. For this purpose, by way of example, the water cooling device of the solar simulator can be connected to the factory cooling water circuit.

As an alternative to the water cooling system, however an air cooling system is also possible, particularly when the luminous modules 1 are operated in a flash mode.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

Thus, for example for weathering installations, a color channel having ultraviolet light in a targeted manner can additionally be provided e.g. by the use of UV LEDs for example in the near UV range, e.g. in a wavelength range of (370+/−50) nm.

For one or more color channels, the light entering into the secondary optical unit 10 may at least partly have been generated by means of a wavelength conversion, to be precise directly in the region of an emitter surface of the LED(s) ("chip-level conversion") or at some distance therefrom ("remote phosphor"). One or a plurality of phosphors, in particular luminescence phosphors, in particular fluorescence and/or phosphorescence phosphors, can be used for wavelength conversion. In particular multiband phosphors, in particular in the visible range, can be used for wavelength conversion.

In the case of chip-level conversion, blue light, in particular, may be converted into green light and/or into red light.

The semiconductor light sources may generally have as a result of a suitable classification ("binning"), a widened wavelength range or widened spectral widths of individual colors.

The light of different semiconductor light sources and/or wavelength ranges may generally at least partly overlap spectrally ("Inter Channel Mixing") or exhibit substantially no overlaps.

LIST OF REFERENCE SIGNS

1 Luminous module
2 First light generating unit
3 Second light generating unit
4 Set of LEDs
5 Set of LEDs
6 Primary optical unit
7 Primary optical unit
8 8 Light exit plane
9 Light output surface
10 Secondary optical unit
11 Light emission surface
12 Tertiary optical unit
21 Luminous module
22 Second light generating unit
23 Third light generating unit
24 Primary optical unit
25 Primary optical unit
B Image region
G Main body
L Longitudinal axis
S Solar simulator
SpS Solar spectrum
SpL LED spectrum
V Distortion

What is claimed is:

1. A solar simulator comprising at least one luminous module, wherein the at least one luminous module has:
   a plurality of light generating units, each of the light generating units comprising a plurality of LED semiconductor light sources and one of either a first type of light-concentrating primary optical unit disposed downstream from the plurality of LED semiconductor light sources or a second type of light-concentrating primary optical unit disposed downstream from the plurality of LED semiconductor light sources, the first type of light-concentrating primary optical unit being different from the second type of light-concentrating primary optical unit, and wherein the at least one luminous module comprises both the first type of light-concentrating primary optical unit and the second type of light-concentrating primary optical unit;
a light-homogenizing secondary optical unit disposed downstream of the light generating units; and
an imaging tertiary optical unit disposed downstream of the secondary optical unit;
wherein the LED semiconductor light sources generate light in a plurality of separately controllable wavelength ranges comprising an infrared wavelength ranges, and wherein the solar simulator is configured to combine the plurality of separately controllable wavelength ranges to simulate solar light.

2. The solar simulator as claimed in claim 1, wherein the light-concentrating primary optical unit is designed and arranged for generating a concentrated light beam having an aperture angle of not more than 15°, in particular of not more than 10°.

3. The solar simulator as claimed in claim 1, wherein the light-homogenizing secondary optical unit comprises a fly's eye condenser.

4. The solar simulator as claimed in claim 1, wherein the at least one imaging tertiary optical unit comprises a Fourier lens.

5. The solar simulator as claimed in claim 1, wherein the at least one luminous module generates a defined pincushion distortion.

6. The solar simulator as claimed in claim 1, wherein the imaging tertiary optical unit generates an image region of a beam bundle emitted by a light-homogenizing secondary optical unit with a close-packable basic shape.

7. The solar simulator as claimed in claim 1, wherein at least one light generating unit has a plurality of semiconductor light sources, wherein the plurality of semiconductor light sources generate light in at least two separately controllable wavelength ranges.

8. The solar simulator as claimed in claim 1, wherein the at least one luminous module comprises a plurality of luminous modules, wherein the plurality of luminous modules generate images substantially adjoining one another.

9. The solar simulator as claimed in claim 8, wherein the adjacent luminous modules generate images which overlap at their distorted edge projections, in particular corners.

10. The solar simulator as claimed in claim 1, wherein the at least one luminous module comprises a plurality of luminous modules, wherein the solar simulator is designed for communication from luminous module to luminous module.

11. The solar simulator as claimed in claim 1, wherein for each the at least one luminous module at least one sensor is present for each separately controllable wavelength range for the purpose of setting the associated color locus.

12. A method for operating a solar
the solar simulator comprising:
at least one luminous module, wherein the at least one luminous module has: a plurality of light generating units, each of the light generating units comprising a plurality of LED semiconductor light sources and one of either a first type of light-concentrating primary optical unit disposed downstream from the plurality of LED semiconductor light sources or a second type of light-concentrating primary optical unit disposed downstream from the plurality of LED semiconductor light sources, the first type of light-concentrating primary optical unit being different from the second type of light-concentrating primary optical unit, wherein the at least one luminous module comprises both the first type of light-concentrating primary optical unit and the second type of light-concentrating primary optical unit;
a light-homogenizing secondary optical unit disposed downstream of the light generating units; and
an imaging tertiary optical unit disposed downstream of the secondary optical unit
wherein the LED semiconductor light sources generate light in a plurality of separately controllable wavelength ranges comprising an infrared wavelength range, and wherein the solar simulator is configured to combine the plurality of separately controllable wavelength ranges to simulate solar light;
wherein the method comprises controlling the plurality of light generating units in such a way that the solar simulator generates a light emission that changes over time.

13. The solar simulator of claim 1, wherein the first type of light-concentrating primary optical unit is configured as a parabolically-shaped reflector shell; and wherein the second type of light-concentrating primary optical unit is configured as an optical waveguide.

14. The method of claim 12, wherein the first type of light-concentrating primary optical unit is configured as a parabolically-shaped reflector shell; and wherein the second type of light-concentrating primary optical unit is configured as an optical waveguide.

* * * * *

UNITED STATES PATENT AND TRADEMARK OFFICE
CERTIFICATE OF CORRECTION

PATENT NO. : 10,295,131 B2
APPLICATION NO. : 13/980326
DATED : May 21, 2019
INVENTOR(S) : Nico Morgenbrod Page 1 of 1

It is certified that error appears in the above-identified patent and that said Letters Patent is hereby corrected as shown below:

In the Claims

Column 13, Line 21, Claim 4:
Please remove "at least one"

Signed and Sealed this
First Day of October, 2019

Andrei Iancu
*Director of the United States Patent and Trademark Office*